(12) United States Patent
Fukano et al.

(10) Patent No.: US 6,764,060 B2
(45) Date of Patent: Jul. 20, 2004

(54) FLOW RATE CONTROL VALVE

(75) Inventors: Yoshihiro Fukano, Kitasoma-gun (JP); Kousaku Inamoto, Tsukuba-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 104 days.

(21) Appl. No.: 10/188,965

(22) Filed: Jul. 5, 2002

(65) Prior Publication Data

US 2003/0006389 A1 Jan. 9, 2003

(30) Foreign Application Priority Data

Jul. 5, 2001 (JP) ........................................ 2001-204698

(51) Int. Cl.[7] .............................................. F16K 31/02
(52) U.S. Cl. .................................. 251/129.12; 251/331
(58) Field of Search ....................... 251/129.11, 129.12, 251/292, 331, 335.2, 367

(56) References Cited

U.S. PATENT DOCUMENTS 3,488,030 A * 1/1970 Hulme et al. .......... 251/129.12
4,556,193 A * 12/1985 Yoshiga ................. 251/129.11
4,586,539 A * 5/1986 Ueno .................... 137/625.38
4,697,727 A * 10/1987 Hubbard, II ............... 226/74

FOREIGN PATENT DOCUMENTS

| DE | 36 38 844 | 5/1988 |
| DE | 41 13 388 | 10/1992 |
| DE | 196 39 307 | 3/1998 |

* cited by examiner

Primary Examiner—Edward K. Look
Assistant Examiner—John K. Fristoe, Jr.
(74) Attorney, Agent, or Firm—Paul A. Guss

(57) ABSTRACT

A flow rate control valve includes a rotary driving source driven by an electric signal, a first movable member screwed axially displaceably in a screw hole by a rotary action of the rotary driving source, a second movable member displaced together with the first movable member, a diaphragm connected to the second movable member, a valve seat on which the diaphragm is seated, and a first fluid port and a second fluid port to which a pressure fluid is supplied or from which the pressure fluid is discharged.

6 Claims, 5 Drawing Sheets

FLOW RATE CONTROL VALVE

BACKGROUND OF THE INVENTION

1. Field of the Invention

The present invention relates to a flow rate control valve for controlling a flow rate of a fluid flowing through a fluid passage. In particular, the present invention relates to a proportional type flow rate control valve using a driving source which is rotatably driven by an electric signal.

2. Description of the Related Art

A conventional flow rate control valve controls a flow rate of a pressure fluid by changing an area of a passage provided in a valve through which the pressure fluid flows, for example, when the pressure fluid is supplied to or discharged from an actuator.

The flow rate control valve comprises a pilot chamber including a diaphragm which is spread in a main valve body. A diaphragm is flexibly bent by a pilot pressure supplied to the pilot chamber for thereby integrally displacing the diaphragm and a valve plug. Thus, the fluid passage is opened/closed.

In the conventional flow rate control valve, the valve plug is opened/closed by the pilot pressure. However, it is difficult to control an opening degree of the valve plug highly accurately at a desired position based upon the pilot pressure, for the following reason.

Specifically, it is difficult to control the pressure of the air supplied as the pilot pressure highly accurately due to the fluctuation in pressure in a pressure fluid supply source. Further, the pilot pressure supplied to the pressure chamber may not correspond to the displacement amount of the valve plug.

SUMMARY OF THE INVENTION

It is therefore a general object of the present invention to provide a flow rate control valve which adjusts an opening degree of a valve plug reliably and highly accurately by controlling an axial displacement amount of a first movable member based upon an amount of rotation of a driving source driven by an electric signal, making it possible to highly accurately control a flow rate of a pressure fluid.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
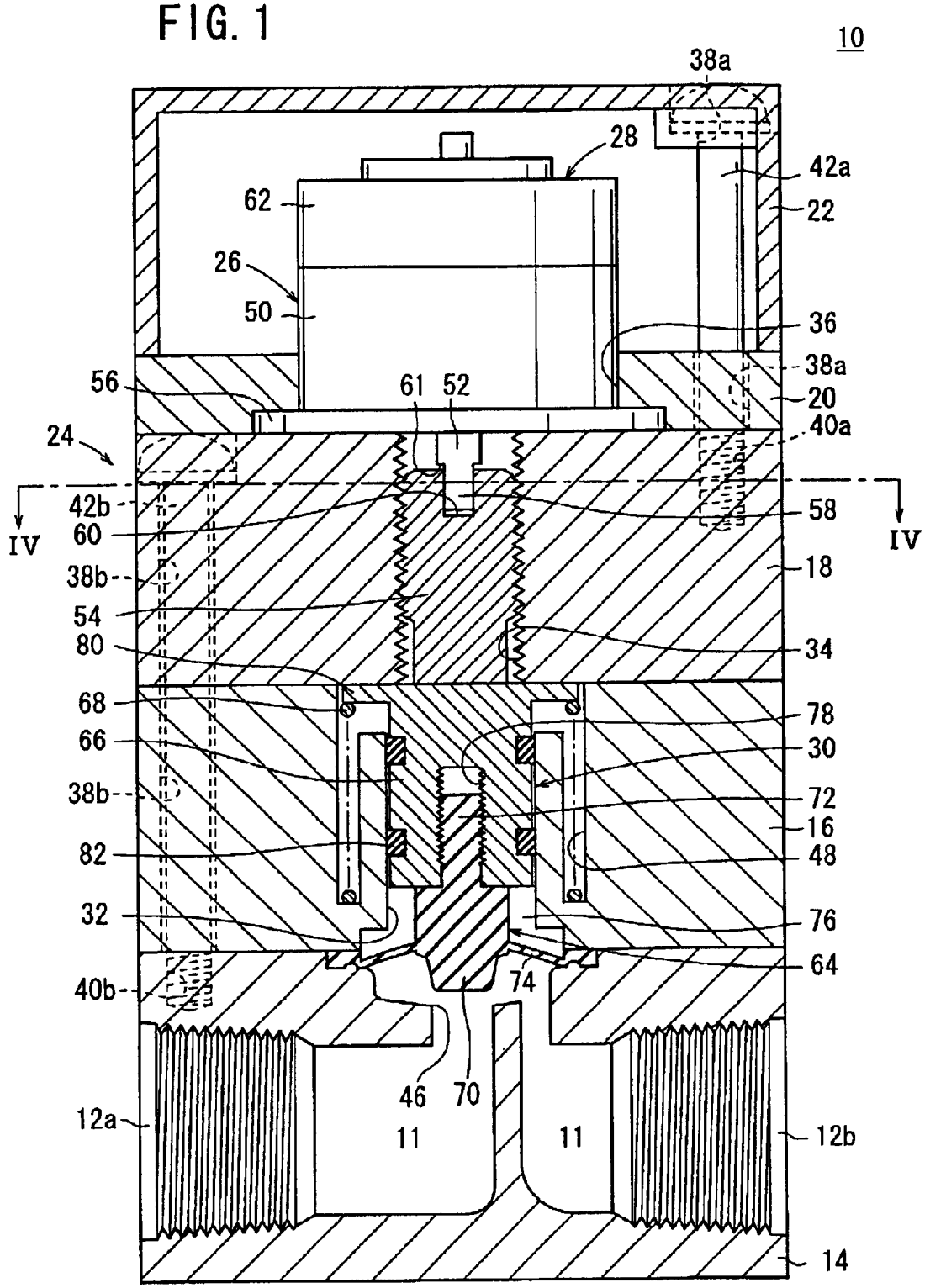
FIG. 1 is a vertical sectional view illustrating an open state of a flow rate control valve according to an embodiment of the present invention.

With reference to FIG. 1, reference numeral 10 indicates a flow rate control valve according to an embodiment of the present invention.

The flow rate control valve 10 comprises a main body 24 which includes a first body 16, a second body 18, a spacer member 20, and a cover member 22 stacked on a valve body 14 having a fluid passage 11 for allowing a pressure fluid to flow therethrough and integrally connected to the valve body 14, a driving section 26 which is rotatably driven by a control signal (pulse signal) outputted from an unillustrated power source by the aid of a controller 53 (see FIG. 5), a detecting section 28 which detects the amount of rotation such as the angle of rotation or the number of revolution of the driving section 26, and a valve mechanism section 30 which opens/closes the fluid passage 11 under the rotary driving action of the driving section 26 and which changes the cross-sectional area of the flow passage of the fluid passage 11.

The main body 24 includes the valve body 14 having a first fluid port 12a supplied with the pressure fluid and a second fluid port 12b discharging the pressure fluid, the first body 16 which is connected to the upper surface of the valve body 14 and which has a through-hole 32 formed at a substantially central portion to extend in the axial direction of the main body 24, the second body 18 which is connected to the upper surface of the first body 16 and which has a screw hole 34 formed at a substantially central portion to make penetration coaxially with the through-hole 32, the spacer member 20 which is connected to the upper surface of the second body 18 and which has a stepped engaging hole 36 formed at a substantially central portion, and the cover member 22 which is connected to the upper surface of the spacer member 20.

Bolt holes 38a are formed through the cover member 22 and the spacer member 20 respectively. Further, bolt screw holes 40a are formed in the second body 18.

A plurality of connecting bolts 42a are inserted into the bolt holes 38a and the bolt screw holes 40a. The plurality of connecting bolts 42a are screwed in the bolt screw holes 40a, thereby integrally fixing the second body 18, the spacer member 20 and the cover member 22.

Similarly, bolt holes 38b are formed through the first body 16 and the second body 18 respectively. Further, bolt screw holes 40b are formed in the valve body 14.

A plurality of connecting bolts 42b are inserted into the bolt holes 38b and the bolt screw holes 40b. The plurality of connecting bolts 42b are screwed in the bolt screw holes 40b, thereby integrally fixing the first body 16, the second body 18 and the valve body 14.

A valve seat 46, on which a diaphragm 64 composed of an elastic member (as described later on) is seated, is formed at a substantially central portion of the valve body 14.

The stepped through-hole 32 is formed at the substantially central portion of the first body 16. An annular groove 48 for installing a spring member 68 as described later on is formed at a position spaced radially outwardly from the through-hole 32 by a predetermined distance. The annular groove 48 is substantially parallel to the through-hole 32.

The screw hole 34 is formed at the substantially central portion of the second body 18. The stepped engaging hole 36 is formed at the substantially central portion of the spacer member 20.

The driving section 26 includes a rotary driving source 50 rotatably driven by the control signal (pulse signal) outputted from the unillustrated power source via the controller 53 (see FIG. 5), and a rotary shaft 52 which transmits the rotary force of the rotary driving source 50.

The rotary driving source 50 is disposed at a substantially central portion in the cover member 22. A flange 56 is interposed between the second body 18 and the engaging hole 36 of the spacer member 20, thereby fixing the rotary driving source 50. The flange 56 has an expanded diameter and is provided at one end of the rotary driving source 50

Figure 5:
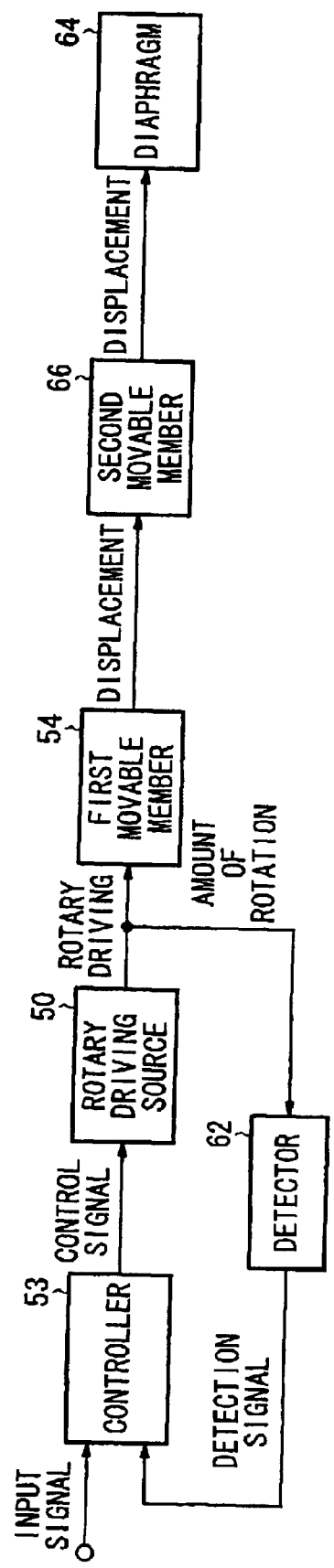
FIG. 5 is a diagram illustrating a circuit arrangement in the flow rate control valve according to the embodiment of the present invention.

The rotary driving source 50 is composed of, for example, a step motor. The rotary driving source 50 is rotated in a step form corresponding to the number of pulses of the control signal (pulse signal) outputted from the controller 53 as shown in FIG. 5.

Figure 4:
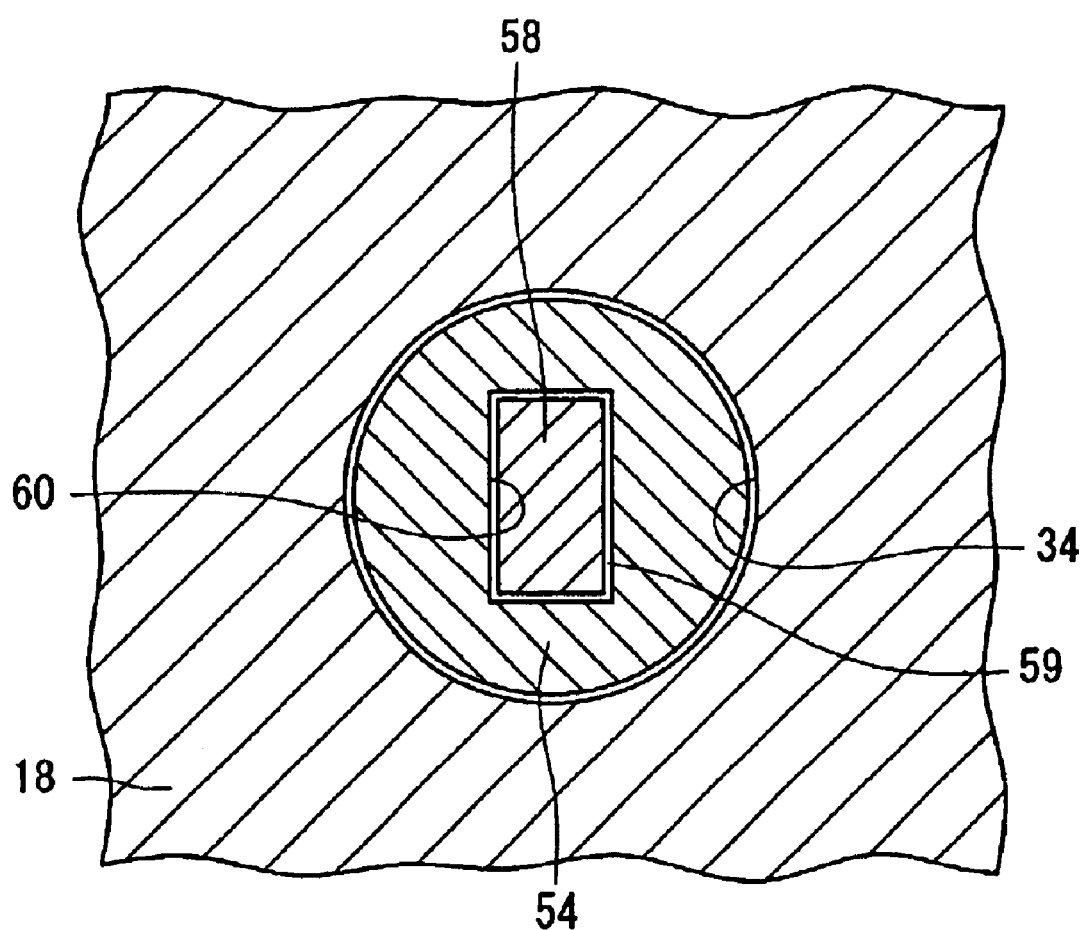
FIG. 4 is, with partial omission, a magnified sectional view taken along a line IV—IV shown in FIG. 1.

The rotary shaft 52 protrudes from one end surface of the rotary driving source 50. A projection 58 of a substantially oblong cross section is formed at the forward end of the rotary shaft 52 (see FIG. 4). The projection 58 is inserted into an engaging groove 60 which is formed on one end surface of the first movable member 54. As shown in FIG. 4, the engaging groove 60 has a substantially oblong cross section for engaging the projection 58 of the substantially oblong cross section with the clearance 59 provided between the engaging groove 60 and the projection 58.

Figure 3:
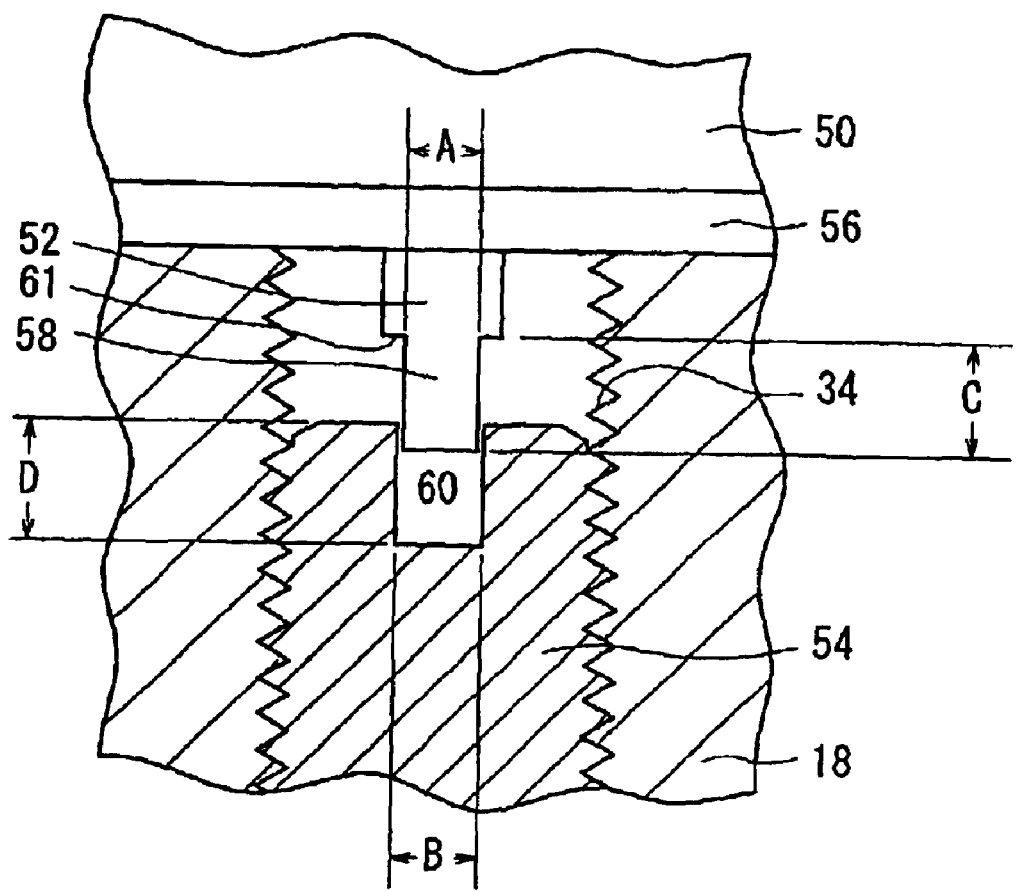
FIG. 3 is, with partial omission, a magnified vertical sectional view illustrating engaging portions of a rotary shaft and a first movable member of the flow rate control valve according to the embodiment of the present invention.

As shown in FIG. 3, the clearance is provided between the engaging groove 60 and the inserted projection 58. The projection 58 has the width (A) slightly smaller than the width (B) of the engaging groove 60.

The projection 58 of the rotary shaft 52 of the rotary driving source 50 is inserted into and engages the engaging groove 60 of the first movable member 54. Accordingly, the first movable member 54 is rotated together with the rotary shaft 52. The first movable member 54 is axially displaced under the screw-engaging action of the screw hole 34 of the second body 18 and the screw section of the first movable member 54. Therefore, the rotary motion of the rotary shaft 52 is converted into the axial rectilinear motion under the engaging action of the first movable member 54.

Further, the projection 58 has the axial length (C) substantially equivalent to or slightly shorter than the axial length (D) of the engaging groove 60. Further, the axial length (C) is set as follows. That is, one end surface of the second movable member 66 is located at a position substantially identical with or under the position of a boundary surface 61 between the projection 58 and the rotary shaft 52 in the valve-open state in which the second movable member 66 is displaced upwardly. Further, the projection 58 is prevented from disengagement upwardly from the engaging groove 60 in the valve-closed state in which the first movable member 54 is displaced downwardly.

As shown in FIG. 1, the detecting section 28 is composed of, for example, a detector 62 such as an encoder for detecting the amount of rotation such as the angle of rotation or the number of revolution of the rotary driving source 50. The detector 62 is provided together with the rotary driving source 50 in the cover member 22. That is, the opening degree of the diaphragm 64 which is displaced under the driving action of the rotary driving source 50 as described later on can be detected by detecting the angle of rotation or the number of revolution of the rotary driving source 50 by means of the detector 62.

For example, an optical encoder is used as the detector 62, the detector 62 has a light source (not shown) for generating light, and a light-receiving element (not shown) for receiving the light from the light source. A rotary plate (not shown) having a slit is interposed between the light source and the light-receiving element. The light-receiving element detects the change in position of light leaked from the slit depending on the angle of rotation of the rotary plate. Thus, the angle of rotation is detected.

As shown in FIG. 5, the rotary driving source 50 of the driving section 26 is driven by the control signal (pulse signal) inputted from the controller 53 into the rotary driving source 50. The angle of rotation of the rotary driving source 50 is detected by the detector 62 of the detecting section 28. The detected angle of rotation of the rotary driving source 50 is inputted as the detection signal into the controller 53.

As a result, as shown in FIG. 5, the controller 53 performs the feedback control. Specifically, the controller 53 makes comparison and judgment for the difference between the input signal (preset signal) inputted into the controller 53 and the detection signal obtained by detecting the amount of rotation of the rotary driving source 50 by using the detector 62 to output the control signal (pulse signal) to the rotary driving source 50 so that the difference may be zero. Accordingly, the difference disappears between the preset value previously set by the input signal and the amount of rotation of the rotary driving source 50. Thus, the opening degree of the diaphragm 64 can be controlled more accurately.

As shown in FIG. 1, the valve mechanism section 30 includes the diaphragm (valve plug) 64 which cuts off the communication between the first fluid port 12a and the second fluid port 12b by being seated on the valve seat 46 of the valve body 14, the first movable member 54 which engages one end of the rotary shaft 52 and which is screwed axially displaceably in the screw hole 34 under the rotary action of the rotary shaft 52, the second movable member 66 which abuts against the end surface of the first movable member 54 and which is inserted axially displaceably in the through-hole 32, and the spring member 68 which urges the second movable member 66 upwardly away from the valve seat 46.

A tapered projection 70, which is seated on the valve seat 46 in the valve-closed state and which has gradually reduced diameters, is formed at one axial end of the diaphragm 64. A shaft 72, on which the screw is engraved, is formed at the other axial end of the diaphragm 64. Further, the diaphragm 64 has a thin-walled skirt section 74 which extends radially outwardly from the projection 70. The outer circumference of the skirt section 74 is installed into an annular groove of the valve body 14, and is interposed between the valve body 14 and the first body 16.

A diaphragm chamber 76 is formed between the second movable member 66 and the diaphragm 64 in the through-hole 32.

The second movable member 66 has a substantially T-shaped cross section. A screw hole 78 in which the shaft 72 of the diaphragm 64 is screwed is formed at one axial end of the second movable member 66. A flange 80, which has a radially outwardly expanded diameter, is formed at the other axial end of the second movable member 66. Seal members 82 are installed on a sliding surface between the second movable member 66 and the through-hole 32 by a plurality of annular grooves.

The spring member 68 is interposed between the flange 80 and the groove 48 of the first body 16. The second movable member 66 is pressed in a direction away from the valve seat 46 by the spring force of the spring member 68. The end surface of the second movable member 66 always abuts against the end surface of the first movable member 54.

That is, the rotary driving source 50 is driven for displacing the first movable member 54 together with the second movable member 66 which is pressed against the first movable member 54 by the spring force of the spring member 68.

Further, the diameter of the flange 80 is larger than the diameter of the screw hole 34. Accordingly, the flange 80 functions as a stopper to prevent the second movable member 66 from being displaced over the joined surface between the first body 16 and the second body 18.

The shaft 72 of the diaphragm 64 is screwed in the screw hole 78 of the second movable member 66, thereby integrally displacing the second movable member 66 and the diaphragm 64.

Further, the seal members 82 installed into the annular grooves abut against the sliding surface of the through-hole 32, thereby keeping the through-hole 32 and the diaphragm chamber 76 airtight.

The flow rate control valve 10 according to the embodiment of the present invention is basically constructed as described above. Next, its operation, function, and effect will be explained.

FIG. 1 shows that the projection 70 of the diaphragm 64 is separated from the valve seat 46, and the first fluid port 12a and the second fluid port 12b are communicated with each other.

At first, a setting value in the controller 53 is set by an input signal. Then, the controller 53 outputs a control signal (pulse signal) to the rotary driving source 50 powered by an unillustrated power source (see FIG. 5).

The rotary driving source 50 is rotated by the inputted control signal (pulse signal), and the rotary shaft 52 is rotated in a predetermined direction together with the rotary driving source 50.

As shown in FIG. 5, the amount of rotation of the rotary driving source 50 is detected by the detector 62, and the detection signal is inputted into the controller 53. The controller 53 judges the difference between the value set by the input signal and a value based on the detection signal. The controller 53 outputs another control signal (pulse signal) to the rotary driving source 50 to make the difference small. Accordingly, a feedback control is performed. As a result, the difference disappears between the value set by the input signal and the amount of rotation of the rotary driving source 50. Therefore, it is possible to more accurately set the opening degree of the diaphragm 64.

The rotary driving source 50 is rotated, and the rotary shaft 52 is rotated together with the rotary driving source 50. The projection 58 of the rotary shaft 52 is engaged with the engaging groove 60 of the first movable member 54. Accordingly, the rotary motion of the rotary shaft 52 is converted into the rectilinear motion in the axial direction of the first movable member 54 under the screwing action of the male screw of the first movable member 54 and the female screw of the screw hole 34 of the second body 18.

The first movable member 54 screwed in the screw hole 34 of the second body 18 is displaced axially downwardly. Accordingly, the second movable member 66, which abuts against the end surface of the first movable member 54, is displaced downwardly together with the first movable member 54 against the spring force of the spring member 68.

When the second movable member 66 is displaced downwardly, the diaphragm 64 connected to the second movable member 66 is displaced downwardly together with the second movable member 66. The projection 70 of the diaphragm 64 is pressed by the valve seat 46. Accordingly, the diaphragm 64 is tightly seated on the valve seat 46 appropriately.

As a result, the communication between the first fluid port 12a and the diaphragm chamber 76 is cut off as a fully closed state.

Subsequently, when the direction of the current supplied to the rotary driving source 50 is reversed, then the second movable member 66 is moved upwardly by the spring force of the spring member 68, and the diaphragm 64 is separated from the valve seat 46 to give the open state.

Figure 2:
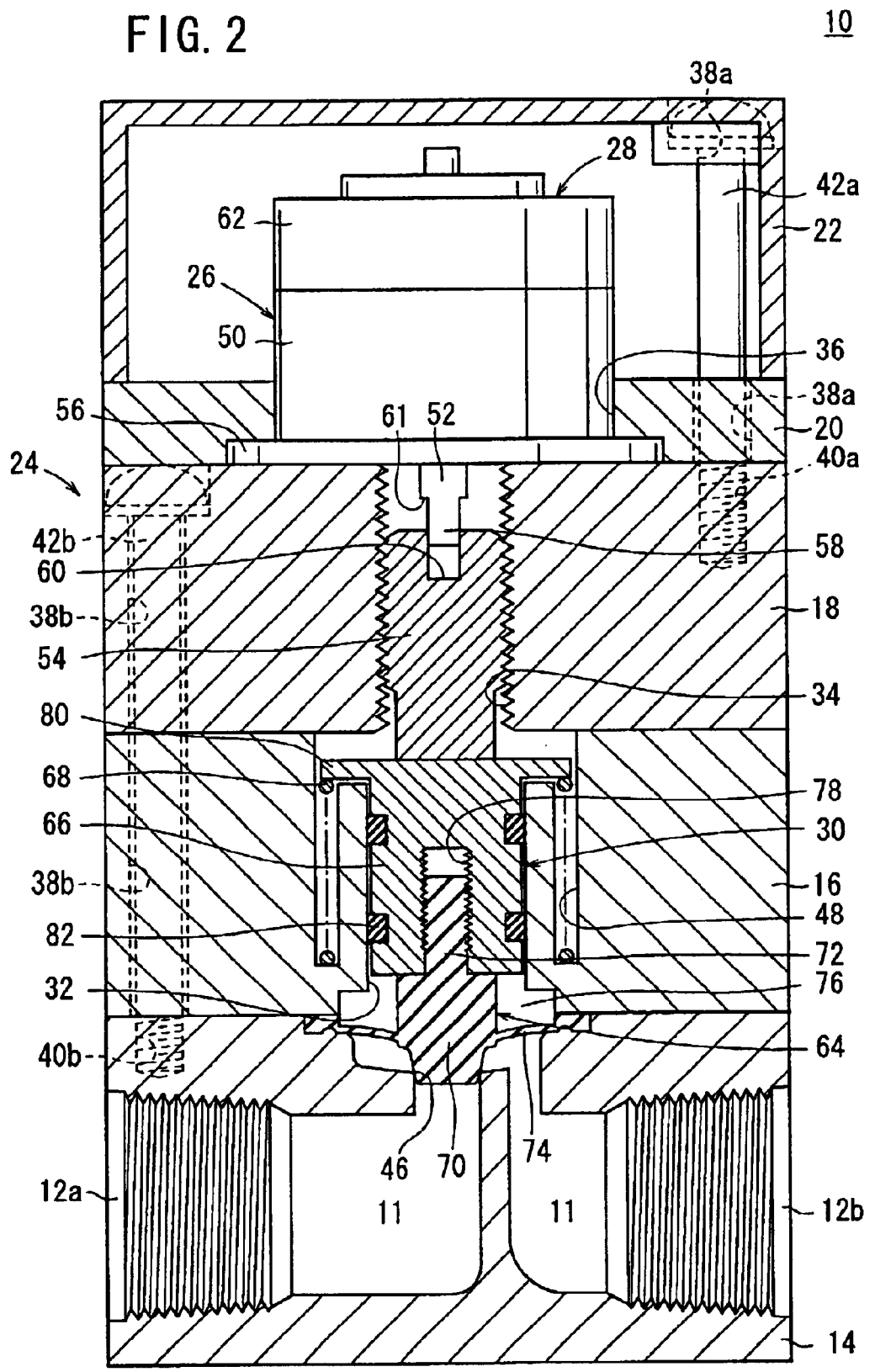
FIG. 2 is a vertical sectional view illustrating a closed state of the flow rate control valve according to the embodiment of the present invention.

That is, as shown in FIG. 2, the rotary driving source 50 is rotated in the direction opposite to the direction to close the valve by the inputted control signal (pulse signal). Accordingly, the rotary shaft 52 is rotated in the direction opposite to the direction to close the valve.

The first movable member 54 screwed in the screw hole 34 of the second body 18 is axially displaced upwardly under the rotary action of the rotary shaft 52. Accordingly, the second movable member 66, which abuts against the end surface of the first movable member 54, is displaced upwardly together with the first movable member 54 by the spring force of the spring member 68.

When the second movable member 66 is displaced upwardly, the diaphragm 64 connected to the second movable member 66 is also displaced upwardly together with the second movable member 66. The projection 70 of the diaphragm 64 is separated from the valve seat 46.

As a result, the first fluid port 12a and the second fluid port 12b are communicated with each other. The pressurized fluid introduced from the first fluid port 12a passes through the second fluid port 12b, and is supplied to an unillustrated fluid pressure-operated apparatus.

As described above, in the embodiment of the present invention, the first movable member 54 is axially displaced under the rotary driving action of the rotary driving source 50 which is driven by a control signal (pulse signal). The second movable member 66, to which the diaphragm 64 is connected, is displaced together with the first movable member 54. Accordingly, the displacement amount of the diaphragm 64 can be controlled by using the angle of rotation of the rotary driving source 50. The adjustment of the opening degree of the diaphragm 64 can be performed more reliably and more accurately than the adjustment performed under the driving action of the pressurized fluid (pilot pressure).

Although certain preferred embodiments of the present invention have been shown and described in detail, it should be understood that various changes and modifications may be made therein without departing from the scope of the appended claims.

What is claimed is:

1. A flow rate control valve comprising:
    a rotary driving source rotatably driven by an electric signal;
    a detector for detecting an amount of rotation of said rotary driving source;
    a first movable member screwed in a screw hole formed in a main body and being displaceable in an axial direction of said screw hole under a rotary action of said rotary driving source;
    a second movable member abutting against an end surface of said first movable member for being displaced together with said first movable member; and
    a valve plug connected to an end of said second movable member for closing a fluid passage when seated on a valve seat,
    wherein an opening degree of said valve plug is adjusted by controlling an axial displacement amount of said first movable member based upon said amount of rotation of said rotary driving source, and wherein a spring member is fastened to a flange of said second movable member, said first movable member is pressed to displace said second movable member against spring force of said spring member, and thus said valve plug is seated on said valve seat, and said second movable member is displaceable in an opposite direction by said spring force of said spring member, and thus said valve plug is separated from said valve seat.

2. The flow rate control valve according to claim 1, wherein an end of a rotary shaft of said rotary driving source is engaged with an engaging groove formed on said end surface of said first movable member with a clearance provided between said end of said rotary shaft and said engaging groove, and said rotary shaft are rotated together with said first movable member under an engaging action between said end of said rotary shaft and said engaging groove.

3. The flow rate control valve according to claim 2, wherein a projection having a rectangular cross section is formed on said end of said rotary shaft, and said engaging groove of said first movable member has a rectangular cross section corresponding to a shape of said projection.

4. The flow rate control valve according to claim 1, wherein said rotary driving source, said detector, said first movable member, said second movable member, and said valve plug are disposed in and coaxially arranged with said main body.

5. The flow rate control valve according to claim 1, wherein said flange of said second movable member serves as a stopper for abutting against a wall surface of said main body to regulate a displacement amount of said valve plug.

6. The flow rate control valve according to claim 1, wherein said spring member is fastened between said flange of said second movable member and an annular groove formed in said main body.

* * * * *